United States Patent [19]

Basta

[11] Patent Number: 4,762,423
[45] Date of Patent: Aug. 9, 1988

[54] EVAPORATION CALORIMETER

[76] Inventor: Walter Basta, Zanaschkagasse 12/29/3, A-1120 Vienna, Austria

[21] Appl. No.: 946,573

[22] PCT Filed: Mar. 27, 1986

[86] PCT No.: PCT/AT86/00024
§ 371 Date: Nov. 24, 1986
§ 102(e) Date: Nov. 24, 1986

[87] PCT Pub. No.: WO86/05879
PCT Pub. Date: Oct. 9, 1986

[30] Foreign Application Priority Data

Mar. 27, 1985 [AT] Austria ................................. 911/85
Aug. 28, 1985 [AT] Austria ................................ 2521/85

[51] Int. Cl.⁴ ........................................... G01K 17/02
[52] U.S. Cl. ....................................... 374/31; 374/54
[58] Field of Search ................... 374/31, 35, 39, 40, 374/32; 73/338; 374/54

[56] References Cited

U.S. PATENT DOCUMENTS

| | | | |
|---|---|---|---|
| 3,433,929 | 3/1969 | Snelling | 219/363 |
| 3,572,084 | 3/1971 | May | 374/10 |
| 4,355,908 | 10/1982 | Weisser et al. | 374/39 |
| 4,480,929 | 11/1984 | Hansen | 374/54 X |
| 4,484,471 | 11/1984 | Swithenbank et al. | 374/39 X |

OTHER PUBLICATIONS

"Differential Thermal Analysis", Ralph H. Müller, Analytical Chemistry-vol. 35, No. 4, Apr. 1963, 2 pages.

Primary Examiner—Daniel M. Yasich
Attorney, Agent, or Firm—Karl F. Ross; Herbert Dubno

[57] ABSTRACT

The invention relates to a calorimeter based on the evaporation principle, for determining the heat supplied by a heating surface and is primarily characterized by that at least two bulbs filled with measuring liquid (2) are provided, whereby at least one bulb (measuring bulb 1) is in good thermal contact with the heating surface (3) and whereby at least one other bulb (comparison bulb 4) is thermally insulated with respect to heating surface (3).

16 Claims, 4 Drawing Sheets

Fig. 7
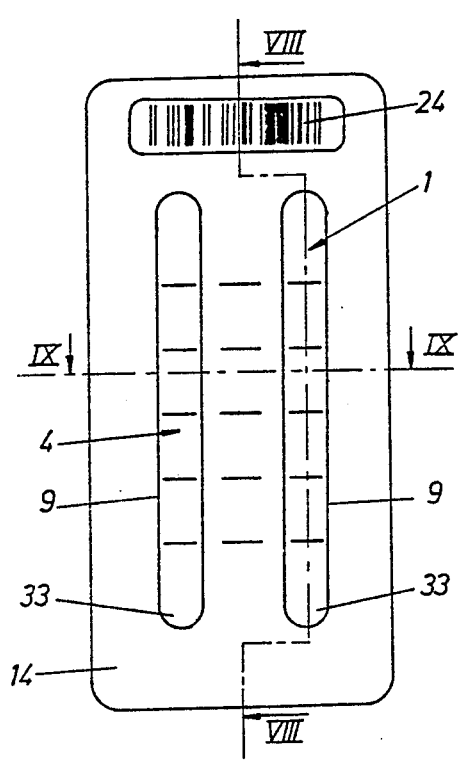
Fig. 8
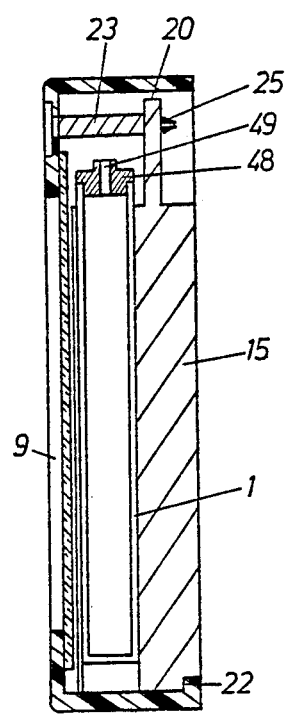
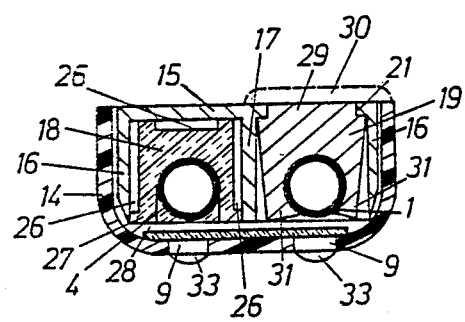
Fig. 9
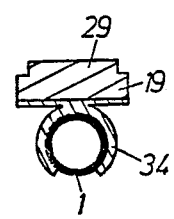
Fig. 10

EVAPORATION CALORIMETER

CROSS REFERENCE TO RELATED APPLICATIONS

This application is a national phase application of PCT/AT86/00024 filed Mar. 27 1986 and based, in turn, on Austrian national applications A911/85 of Mar. 27 1985 and A2521/85 of Aug. 28 1985 under the International Convention.

FIELD OF THE INVENTION

The invention relates to a calorimeter based on the evaporation principle to be used for determining the heat supplied by a heating surface. Such calorimeters are used especially for the allotment of heating charges in housing projects. Such heating-cost allotment devices have the purpose of establishing the actual amount of heat supplied to various space units (apartments, business locales and such) heated from a common heating plant and after that so that charges can be divided in accordance with the actual heat supply.

BACKGROUND OF THE INVENTION

The known-heating-cost dividers operating on the evaporation principle consist basically of a bulb filled with a measuring liquid. Such a device is described in detail further below. Such dividers of heating costs have the disadvantage that under the influence of external factors, such as sunlight, proximity to an oven, hot water in the bathroom, etc, and also under the influence of cold evaporation, erroneous values can be given, which results in an erroneous apportionment of the heating costs. Due to the mentioned external influences, more measuring liquid evaporates from the bulb than corresponds to the actual heat supplied by the heating apparatus, which leads to the allotment of a higher fraction of the heating cost. Especially the radiation from external heat sources has proven to be a problem in measuring of the heat amounts.

A certain compensation of the so-called cold evaporation of the measuring liquid (spontaneous evaporation of the measuring liquid within the measuring period without heating of the heat surfaces) has been achieved by filling the bulb with a larger amount of measuring liquid such that the additional volume corresponds to a value established by experience. This type of compensation can give only a rough average value, which does not take into consideration the individual condition of the heated rooms. Further, only the cold evaporation can be compensated in this manner, but not the external influences mentioned above, such as radiation from external heat sources.

OBJECTS OF THE INVENTION

It is an object of the invention to provide a calorimeter based on the evaporation principle, which permits the most exact measurement possible of the heat supply, even under the influence of external factors and which has the most simple construction possible and is inexpensive to produce.

It is an object to minimize the unauthorized manipulation of the calorimeter, such as for instance by covering it with a damp cloth.

SUMMARY OF THE INVENTION

The calorimeter according to the invention eliminates all the above-mentioned disadvantages and comprises two bulbs with measuring liquid. At least one bulb (the measuring bulb) is in good heat-conductive contact with the heating surface and whereby a further bulb (the comparison bulb) is thermally insulated from the heating surface.

According to the invention the measuring bulb and the bulb are arranged in a common housing of thermally-insulating material and a heat bridge is provided between the heating surface and the measuring bulb. The measuring bulb is located closer to the heating surface than the comparison bulb.

Between the measuring bulb and the comparison bulb an air gap is provided in order to increase the heat insulation of the comparison bulb. The housing is covered on the reading side with a transparent plate or covering foil.

The thermally conductive contact between the measuring bulb and the heating surface has a minimal heat-conductibility of 100 $W \cdot m^{-1} \cdot K^{-1}$. Advantageously, between the transparent plate or covering foil and the bulbs or the housing, an air gap is provided. The outside of the housing or a segment attached thereto can be made of a thermally sensitive material, for instance synthetic material with a low melting point or fusible crystals, in order to permanently indicate the influence of external heat sources. The air gap between the housing and the bulbs can surround at least partially the heat-insulating material or insulating block.

The calorimeter can have a housing and an insert which essentially closes the housings towards the outside. The insert can have two outer shanks and an intermediate wall, the insulation block with the comparison bulb and the heat-conductive block with the measuring bulb being arranged therebetween.

Between the insulation block and one of the outer shanks and preferably also oppositely to the back wall of the insert and oppositely to the intermediate wall, air gaps are provided. The air gaps can be connected with the air gap between the bulbs and the housing. The insert can have a perforation on its back wall for the contact surface of the thermally-conductive block. Moreover a contact plate, resting against the shell surface, can be provided. The thermally-conductive block can partially surround the measuring bulb in a spring-like manner. Specifically a spring clip for gripping the measuring bulb can be provided.

The housing can be connected with the insert by at least one index bolt. The index bolt can have a code plate on one side, which after the instrument is assembled, comes to lie at the frontal side of the housing. The index bolt has a locking member which engages in a corresponding recess of the insert.

Advantageously, in front of the slots for reading the measured values, magnifying glasses are provided. The bulbs are partially closed with a plug having a passage opening, the opening of the plug being closed during transportation. The measuring bulb and the comparison bulb can be arranged next to each other, essentially parallel to each other. The measuring bulb and the comparison bulb can also be arranged one under the other, whereby the insert is built to contain correspondingly the thermally-conductive block and the insulation block.

The measuring bulb has at least one planar surface which is in good surface contact with the heat bridge made of a thermally-conductive material. At least one surface segment can extend over an essential part of the bulb, in a longitudinal direction. The surface segment can extend at least over the maximal filling level of the measuring liquid in the measuring bulb.

The bulb can be basically prismatic and have at least one of the prism surfaces in surface contact with the thermal bridge. In this case, the bulb has a quadrangular, particularly a square cross section, and is surrounded on three parts by the thermal bridge.

The heat bridge can have an angular U-profile, which surrounds the bulb on three sides.

Advantageously, the bulb is made of synthetic material, particularly a thermoplastic material. The bulb can be injection molded and injected in the U-profile.

The frontal side of the bulb can be provided with a grading scale.

The back side of the bulb can be mirror-reflected towards the reading side.

At least one side wall of the bulb can be applied to the thermal bridge and at least one other side wall can be transparent or translucent for the purpose of reading the liquid level. In this case, three side walls of the bulb form an angular U-profile and the fourth side wall is formed by a transparent or translucent material.

The bulbs can contain octyl alcohol as the measuring liquid, which preferably contains a dyestuff, in given cases luminescent dyes.

BRIEF DESCRIPTION OF THE DRAWING

The above and other objects, features and advantages of the present invention will become more readily apparent from the following description, reference being made to the accompanying drawing in which:

FIGS. 7 to 9 are respectively an elevational view and the sections therethrough along the sectional lines VIII—VIII and IX—IX of FIG. 7;

FIG. 10 is a section through a further embodiment of a detail of the calorimeter;

SPECIFIC DESCRIPTION

Figure 1:
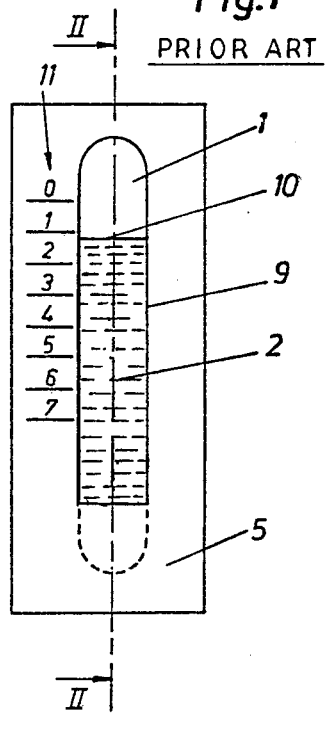
FIG. 1 is a frontal view of a known calorimeter based on the evaporation principle.
Figure 2:
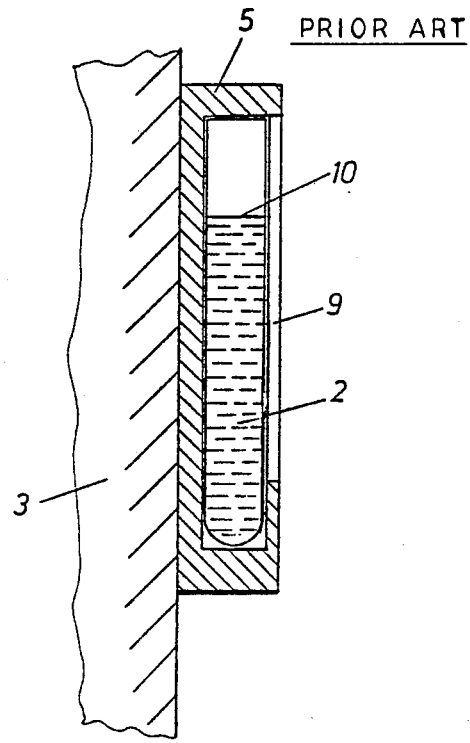
FIG. 2 is a section taken along line II—II of FIG. 1.

In the FIGS. 1 and 2, the construction of a known type of heating-costs divider is represented. In a housing 5, a measuring bulb 1 is located. The measuring bulb 1 is partially filled with a measuring liquid 2. The housing 5 has a slot 9 on the reading side, through which the level 10 of the measuring liquid can be monitored. At the margin of the slot 9 a measuring scale 11 is provided, through which the respective level 10 of the measuring liquid can be read. The housing 5 is made of a heat-conductive material and the whole device is solidly connected to the heating surfaces. The heat transfer from the heating surface 3 over the housing 5 to the measuring liquid 2 results in an evaporation of the measuring liquid and a corresponding lowering of the liquid level 10. The more heat that is supplied from the heating surface 3, the lower falls the level 10 of the measuring liquid. However, as previously mentioned, the measuring liquid 2 evaporates also without heating by the heating surface 3 (cold evaporation) or under the influence of heat coming from external sources (for instance sun beams).

Figure 3:
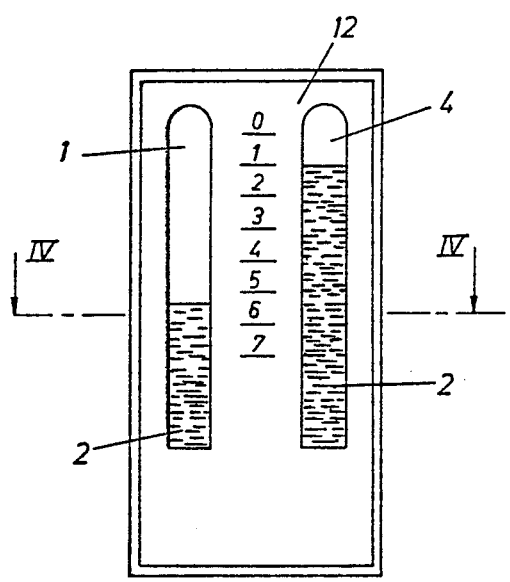
FIG. 3 is a front elevational view of an embodiment of the calorimeter according to the invention.
Figure 4:
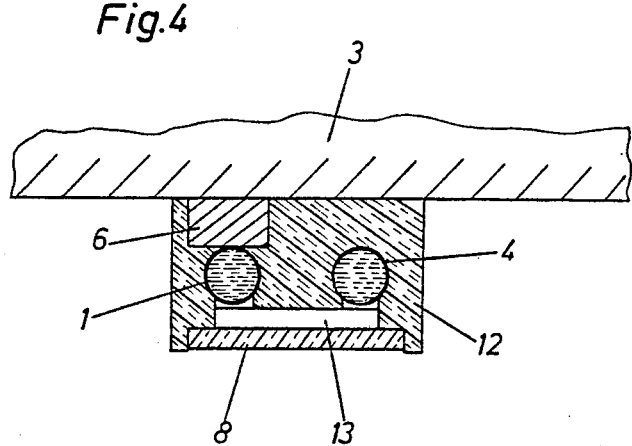
FIG. 4 is a section taken along line IV—IV of FIG. 3.

The FIGS. 3 and 4 show a first embodiment of the calorimeter according to the invention. In the housing 12 two bulbs filled with measuring liquid 2 are provided, namely the measuring bulb 1 and the comparison bulb 4. For the measuring bulb 1, in the housing 12 a thermal bridge 6 made of a heat-conductible material, for instance metal, is mounted. This heat bridge establisheds a heat-conducting contact between the heating surface 3 and the measuring bulb 1. The comparison bulb 4 is heat-insulated with regard to the heating surface 3, whereby the heat insulation is insured by a good heat-insulating material of the housing 12. The side where the reading takes place is covered by a transparent plate in the form of a covering foil 8.

The arrangement of the two bulbs 1 and 4 in a common housing and the arrangement of the covering foil 8 bring with them the advantage that an improper influence on the evaporation of the measuring liquid in the comparison bulb 4 is practically impossible, since each such influence acts in the same manner upon the measuring tube 1. The value to be considered for the heat amount is given by the difference in measuring the liquid level in the measuring bulb 1 and the comparison bulb 4. External influences which act upon both bulbs have no impact on these differential readings and thereby do not alter the measured value.

Departing from the concept that at least one bulb registers the heat supply from the heating surface and the external influences, including the cold evaporation and that the external influences only, including the cold evaporation, are measured by a comparison bulb, and that the difference between these values is the measure of the heat supply coming from the heating surface 3, I can describe several advantageous embodiments of the invention.

Figure 5:
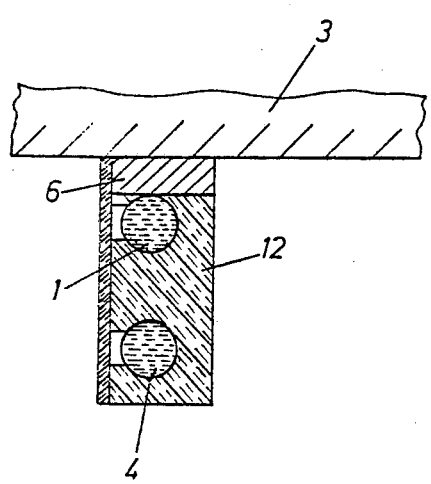
FIGS. 5 and 6 show further embodiments of the invention in sections similar to FIG. 4.
Figure 6:
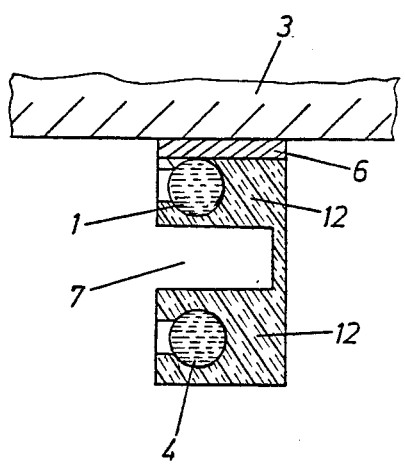

In FIG. 5, an embodiment is represented, wherein the measuring bulb 1 is located closer to the heating surface 3 than the comparison bulb 4. In this way, the comparison bulb 4 is at a greater distance from the heating surface 3, which, in addition to the insulation effect of the housing 12, improves its thermal separation from the heating surface 3. The same applies to the embodiment according to FIG. 6, wherein an air gap 7 is provided between the measuring bulb and the comparison bulb. As a result, the influence of the heating surface 3 on the comparison bulb 4 can be reduced even more.

In order to establish the amount of heat supplied by the heating surface 3, one can use as a departing point the differential measurment between the two bulbs, as well as a value which can be calculated for instance from the absolute value of the measuring bulb 1 and the mentioned differential value between the two bulbs. An influence upon the comparison bulb 4 through heat transfer from the heating surface 3 remains without a detrimental result, since such an influence is identical in all heating-cost allotment devices of the same type and thus can be taken into consideration when the instruments are calibrated. This applies basically also to the following embodiment.

In the embodiment of FIG. 4, an air gap 13 is provided between the housing 12 and the covering foil 8.

This air gap prevents an unauthorized manipulation through unilateral heating of the comparison bulb 4. Through the air gap 13, this heating would be also transferred to the measuring bulb 1, and the differential value would be preserved. As described below, the air gap can also be established laterally around the bulb, in order to improve safety against manipulation. Further, the covering foil 8 or another external part of the housing 12 can be made of heat-sensitive material, for instance of synthetic material with low melting point or through the arrangement of fusible crystals, to insure that each external heating surpassing a certain value is permanently indicated.

FIGS. 7 to 9 show a particularly preferred embodiment. The instrument comprises a housing 14, preferably made of synthetic material, wherein an insert 15 is fitted, which also forms the backside of the housing. Through both slots 9, the measuring liquid in the measuring bulb 1 and the comparison bulb 4 can be monitored.

The insert 15 has a cross section shaped like a double U and receives between its external flanks 16 and the intermediate wall 17 an insulating block 18 and a heat-conductive block 19, which is a heat bridge. The insert 15 covers essentially the backside of the housing 14, but has an opening 20 at the top, through which a gas exchange can take place with the environment, as well as an opening 21 for the heat block 19. The fastening of the insert 15 in the housing 14 is done by an inwardly extruding ledge 22 at the back and by an index bolt 23. This index bolt carries a code plate 24 with indications for the reader of the instrument and has a pin 25 which engages in a hole in the insert 15 and can be disengaged only through destruction. After being assembled, the instrument is lead-sealed this way.

The insulation block 18 has approximately the length of the comparison bulb 4, while the heat-conductive block has the length of the measuring bulb 1. The insulation block 18 is preferably made of foam material. It has air gaps 26 located between webs 27. If the webs are perforated, a gas exchange can take place with the air gap 28, which connects the areas of the two bulbs.

The heat-conductive block 19 is made of metal. It extends with its contact surface 29 through the perforation 21 in the insert 15 in the direction of the heating surface (not shown here). The contact surface 29 has to be fastened to the heating surface with the best possible heat contact. In broken lines, another contact plate 30 is shown, which facilitates an even better heat transfer and in addition insures that the entire instrument is located at a distance from the heating surface, in order to improve the insulation with respect to the comparison bulb 4. The contact plate 30 can also be made in one piece with the heat block 19.

The measuring bulb 1 has to be lodged as tightly as possible in the receiving space in the heat-conductive block 19. For this purpose the two wings 31 can be springs.

The slots 9 of the housing 14 are covered in the front by a transparent pane 32. The magnifying glasses 33 facilitate the reading. The measuring scale (not specifically identified but represented by vertically spaced horizontal lines) can be arranged either on the housing 14, the magnifying glasses 33, on the panel 32 or the bulbs 1, 4 (FIG. 7). As can be seen in FIG. 8, the measuring bulb 1 (and in the same way the comparison bulb 4) is closed at the top by a plug 48. The opening 49 permits the evaporation of the measuring liquid. The cross section of the opening has to be adjusted to the volatility of the measuring liquid. For transportation purposes, the opening 49 can be closed, for instance by a tight cap which is formed as a part of the plug and which is cut off during the assembly of the bulb.

FIG. 10 shows another embodiment of the thermally-conductive block. A spring clip 34 is here provided to receive the measuring bulb 1, which insures a better spring effect and thereby a better heat conductibility.

Figure 11:
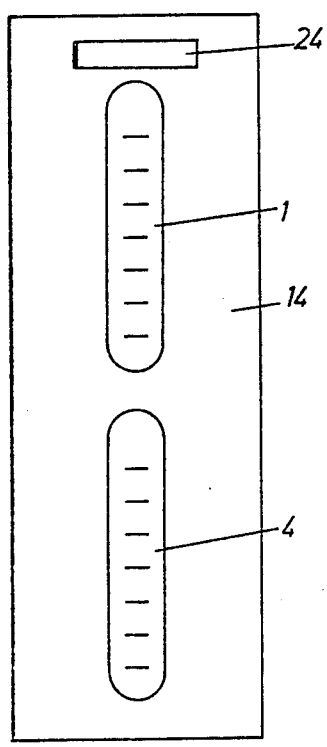
FIG. 11 is a front elevational view of another embodiment.

FIG. 11 shows an embodiment of the measuring device with bulbs arranged one under the other. In this way the instrument can be built narrower and can, for instance, be inserted between the ribs of a radiator. Identical parts are marked with identical reference numerals.

In the previously described embodiments, the bulbs 1, 4 are each described as having round cross sections. This can lead to difficulties in heat transfer, since an adjustment of the round recess in the heat-conductive block 19 is difficult in practice. Thus the heat transfer can take place only at undefined points or surface segments.

The FIGS. 12a–12d and 13 show bulb constructions which overcome these disadvantages. The bulbs have, departing from a round cross section, at least one plane surface, where the heat transfer can be better.

Figure 12A:
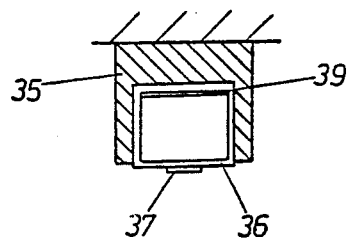
FIGS. 12a to 12d show schematic cross sections through further advantageous embodiments of details of the calorimeter according to the invention.
Figure 12B:
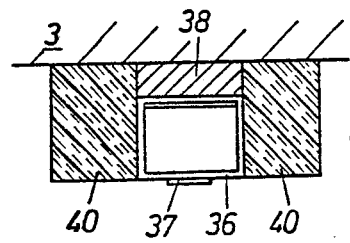

FIGS. 12a and 12b show measuring bulbs with rectangular cross section. The heat-conductive block 35 surrounds the bulb 36 from three sides for very good heat transfer. On its frontal surface the bulb carries the measuring scale 37. This measuring bulb with the heat-conductive block can, for instance, be used in a measuring instrument according to FIGS. 4 to 11. A mirror coating marked with 39 can facilitate reading of the scale.

Figure 12C:
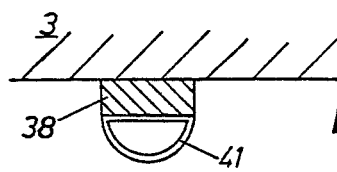
Figure 12D:
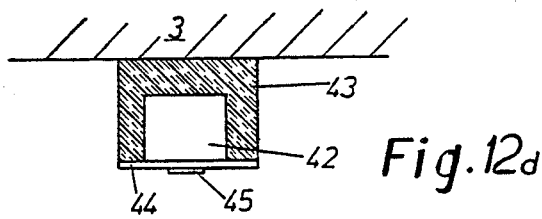

The same applies also to the embodiments of FIGS. 12c and 12d. In FIG. 12b, the heat bridge 38 rests only against the back side of the bulb. On its other two sides, the bulb 36 is surrounded by insulating material 40. In FIG. 12c, the bulb 41 has a semicirular cross section. FIG. 12d shows an embodiment wherein the bulb 42 is defined on three sides by the heat-conductive block 43 and by the transparent frontal plate 44 with the measuring scale 45.

Figure 13:
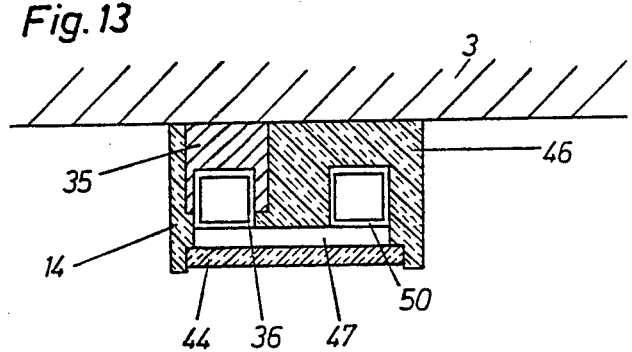
FIG. 13 is a further development of the invention, shown in section.

FIG. 13 shows a section through a measuring device with a measuring bulb according to FIG. 12a. The comparison bulb 50 has also a rectangular, preferably square cross section and is surrounded by the insulating mass 46. The simply configured air gap 47 serves, as previously described, as a safeguard against manipulation. The frontal viewing plate 44 frontally closes the air gap. It is self-understood that the individual features of the preceding embodiment examples can be applied also in this case, as for instance air gaps around the insulation block, construction of the insert and the housing, etc. Each measuring instrument can also have more than two measuring bulbs.

In the afore-described bulbs a measuring liquid which facilitates the reading by color contrast is preferred. An advantageous liquid is dyed octyl alcohol, which does not present any health hazards. In the embodiments according to FIGS. 7 to 11, the evaluation and documentation of the measuring results can very well be done by photographic means. Through the code plate 24, a clear allotment for each consumer becomes possible.

Further, it is obvious that within the framework of the invention, a bulb with round or oval cross section can be combined in the same instrument with a bulb of different cross section (for instance square).

The spring clip 34 according to FIG. 10 can extend over the entire length of the measuring bulb 1 and can be transversely subdivided once or several times over this length. The housing of the measuring instrument and particularly the lateral walls and the back side can be adjusted at will to the heating surface, through corresponding shaping.

The measuring liquid already mentioned before, octyl alcohol, offers the advantage of non-toxicity and does not attack synthetic materials. Preferably, the measuring liquid is dyed, in order to facilitate the reading. Luminescent dyes (fluorescent dyes) can be used.

The thermal contact between the heating surface 3 and the measuring bulb 1 is preferably done so that a minimal thermal conductivity of 100 $W \cdot m^{-1} \cdot K^{-1}$ results. The bulbs according to FIGS. 12a, b and d, as well as to FIG. 13 have rectangular cross section and are therefore parallelepipedic. Another prismatic shape can also be used. The surface segment which is in surface contact with the thermal bridge extends preferably over the maximum liquid level of the bulb. The bulbs can be made of glass or also of synthetic material, particularly a thermoplastic material. When injection-molded synthetic material is used, the bulb can be injected into the thermal bridge with angular U-shaped cross section. It is within the framework of the invention that the various features of the illustrated embodiments can be diversely combined, for instance, the embodiments according to FIGS. 7 to 10 with prismatic bulbs according to FIGS. 12a-d.

I claim:

1. A liquid-evaporation calorimeter for determining the heat delivered from a surface, comprising:
    a housing composed of a thermally insulating material and mounted on said surface;
    a measuring bulb in said housing containing a liquid evaporatable by heat delivered from said surface and provided with a vent to release vapors of said liquid, whereby a level of said liquid in said measuring bulb drops upon heating of said measuring bulb and evaporation of said liquid in said measuring bulb;
    a comparison bulb in said housing thermally isolated from said surface and containing said liquid, said comparison bulb being provided with a vent to release vapors of said liquid, whereby a level of said liquid in said comparison bulb drops upon evaporation of said liquid in said comparison bulb;
    heat-conductive means in said housing forming a thermal bridge in direct contact with said measuring bulb, spaced from said comparison bulb and in heat-conducting relation with said surface for conducting heat from said surface to said measuring bulb; and
    a transparent plate on said housing covering at least portions of said bulbs and through which said levels are visible, said transparent plate defining in said housing with said bulbs an air gap separating said plate from said bulbs, whereby a difference in said levels represents heat delivered by said surface.

2. The calorimeter defined in claim 1, further comprising a scale on said housing juxtaposed with said levels and viewable upon viewing of said levels through said plate to provide a measurement of said levels.

3. The calorimeter defined in claim 2 wherein said comparison bulb is at least partially enclosed in a thermally insulating block received in said housing.

4. The calorimeter defined in claim 3 wherein said air gap extends at least partially around said thermally insulating block.

5. The calorimeter defined in claim 2, further comprising means defining an air gap between said measuring bulb and said comparison bulb.

6. The calorimeter defined in claim 2 wherein said housing is open toward said surface, said calorimeter further comprising an insert receivable in said housing for closing said housing toward said surface, said insert receiving said bulbs and having an opening through which said thermal bridge extends into heat conducting relationship with said surface.

7. The calorimeter defined in claim 6 wherein said insert has two outer shanks and an intermediate wall extending into said housing and away from said surface, said thermal bridge being a heat-conducting block enclosing said measuring bulb and received between one of said outer shanks and said intermediate wall, said comparison bulb being received in a thermally insulating block disposed between the other outer shank and said intermediate wall.

8. The calorimeter defined in claim 7 wherein air spaces are provided between each of said blocks and said intermediate wall.

9. The calorimeter defined in claim 7 further comprising a metallic contact plate resting against said heat conducting block on a rear face of said insert and engageable with said surface.

10. The calorimeter defined in claim 7 wherein said thermally conducting block engages partly around said measuring bulb in a spring-like manner.

11. The calorimeter defined in claim 7 wherein said thermally conducting block includes a spring clip engaging said measuring bulb.

12. The calorimeter defined in claim 2 wherein said housing is formed with viewing slots extending along said bulbs and covered by said plate through which said levels can be viewed, further comprising respective magnifying glasses over said slots on said housing.

13. The calorimeter defined in claim 1 wherein said bulbs are disposed in said housing one above another.

14. The calorimeter defined in claim 1 wherein at least one of said bulbs is of a polygonal cross section having a planar surface in contact with said bridge.

15. The calorimeter defined in claim 1 wherein at least one of said bulbs has a mirror-reflective rear surface opposite a viewed side of the respective bulb.

16. The calorimeter defined in claim 1 wherein said housing is provided with means permanently changing in condition upon an external application of heat to the calorimeter for indicating said external application of heat.

* * * * *